United States Patent [19]
Schrag

[11] Patent Number: 5,459,609
[45] Date of Patent: Oct. 17, 1995

[54] HERMETICALLY SEALED OPTICAL MOUNTING ASSEMBLY

[76] Inventor: Grant M. Schrag, 9398 Heartwellville Ave., Englewood, Fla. 34224

[21] Appl. No.: 115,224

[22] Filed: Sep. 1, 1993

[51] Int. Cl.$^6$ ....................................................... G02B 7/00
[52] U.S. Cl. ........................... 359/513; 359/894; 73/330; 73/334
[58] Field of Search ..................................... 359/513, 514, 359/894, 895; 73/330, 334

[56] References Cited

U.S. PATENT DOCUMENTS

| | | | |
|---|---|---|---|
| 4,892,321 | 1/1991 | Colgate et al. | 277/167.5 |
| 4,986,636 | 1/1991 | Contzen et al. | 359/513 |

*Primary Examiner*—F. L. Evans
*Attorney, Agent, or Firm*—Janet K. Castaneda; James E. Eakin

[57] ABSTRACT

An ultra-high, hermetically sealed optical mounting assembly for sealing a fragile optical element includes a lid portion defining a thin, bendable flange spring member to gradually and evenly apply a relatively low sealing load at a knife edge for grasping the optical element. A base portion defining a substantially non-bendable, mating flange surface defines a mating base, knife edge. A deformable metallic gasket is interposed between both knife edges and the optical element. An engineered gap between the opposed lid and base flanges and a second, optional gap between the lid and base nearest the window are used to control the amount of spring forces and the amount of compression on the window. A modest sealing pressure applied to the outer edge of the lid flange bends the flange towards the base to spring the remainder of the lid outwardly from the mating base thereby causing the sealing forces to be gradually transferred through the outwardly bending central portion of the lid to the knife edges which then gradually and evenly press against the metallic gaskets to seal the window. The bent lid flange is welded to the base forming a hermetic joint around the entire periphery of the optical mounting assembly. In other aspects, the spring mechanism is an angled spring member integral with the contact areas and a vacuum guard may connect with the sealed cavity formed between the ultra high vacuum seal around the window and the hermetic seal around the flange.

19 Claims, 6 Drawing Sheets

HERMETICALLY SEALED OPTICAL MOUNTING ASSEMBLY

TECHNICAL FIELD

The present invention relates to ultra-high vacuum optical mounting assemblies. More particularly, the invention relates to a mechanical method of sealing glasses, minerals, ceramics and crystals capable of transmitting light, to supporting metal flanges thereby making them useful for transmitting electromagnetic radiation into sealed environmental chambers. The optical mounting assemblies are particularly suitable for creating low-strain seals between fragile optical materials and supporting metal members using low vapor pressure, impermeable sealing materials only.

BACKGROUND OF THE INVENTION

Ultra-high vacuum conditions, and apparatus capable of maintaining an ultra-high vacuum, are widely used to control environments requiring exceedingly low levels of contamination, such as the environments required for the fabrication processes of integrated circuit semiconductors, linear accelerators, surface analytical instrumentation and space simulation chambers. Ultra-high vacuum environments, below $10^{-9}$ torr, require that constituent chamber materials have intrinsically low vapor pressure. At room temperature, the combined efflux, due to outgassing of residual contamination and the vapor pressure of all of the materials used in the fabrication of the device, should not exceed the desired pressure. Furthermore, at moderately elevated temperatures, up to 400° Celsius, the vapor pressure of the materials used in the construction of the chamber should not exceed the speed at which the vacuum pumps can evacuate the efflux from the vessel. Elevating the temperature while simultaneously vacuum pumping a container is referred to as "baking-out", or thermal cycling, and results in a dramatic reduction of contamination via evaporation by reduction of pressure and removal of the source of outgassing. If the materials used in the fabrication of the vacuum device are also intrinsically impermeable to the passage of contamination, the vacuum levels may be maintained by appropriate pumping systems.

Vacuum systems of this type thus require near perfect seals which are able to withstand the thermal and pressure cycling of the system, and are also able to maintain a seal at all aperture points and openings to the environment outside of the vacuum system while subjected to a wide range of temperatures and pressures.

Particularly important are the seals provided for inlets through the chamber wall of an ultra-high vacuum or pressure vessel for performance of specialized functions within the vacuum chamber. For instance, to provide inlets for light into a vacuum or pressurized system, hermetically sealed optical elements are required.

Presently, viewports which are suitable for ultra-high vacuum use are manufactured using windows metallized on the outer perimeter and brazed or soldered to a supporting metal member using a suitable vacuum alloy, or by fusing the viewport material directly to a thinned-metal member such as a glass-metal seal or Housekeeper(tm). These methods are limited to use principally with three optical materials: sapphire (crystalline aluminum oxide), fused quartz (amorphous silicon dioxide) and sealing glass (amorphous borosilicates). The resulting ultra-high vacuum viewports produced by these metallization methods are typically not of high optical quality because of strains induced in the optical material by the sealing process.

Furthermore, materials compatible with seals of this type are limited by several factors. First, the metallization process requires that the substrate material have an oxygen atom as part of its chemical makeup. Second, the materials joined by brazing or fusing are subjected to extremely high temperatures, greater than 800° Celsius, to set-up the seals prior to cooling to room temperature. Even if the optical material has an adequately low vapor pressure to survive such excursions in temperature, it must also be capable of withstanding the resultant sealing stresses induced by dissimilar expansion rates of the materials. Partial compensation for different materials may be achieved by thinning the metal member and carefully selecting the metal components to ensure expansion characteristics similar to the optical substrate. Third, the direct fusion of an optical element to a supporting metal member requires that the optical material be wet to adhere to the metal member through the growth of an oxide layer therebetween.

These above described metallization methods then constitute permanent methods of manufacturing hermetically sealed optical assemblies generally suitable for viewing, but not suitable for producing distortion free optical assemblies. Additionally, these assemblies are not compatible with many materials which transmit outside the visible and near infrared region of the electromagnetic spectrum.

Alternate methods of constructing vacuum optical assemblies exist which are not appropriate for ultra-high vacuum use. These methods usually employ materials which are either permeable to gaseous contamination or have an intrinsically high vapor pressure. Seals of this type are typically produced at room temperature or at low temperatures. These methods include elastomeric O-ring seals, epoxy seals, silver halide seals. O-ring seals employ materials which are not compatible with thermal cycling and are to a certain extent permeable to gases. Epoxy materials outgas due to their high vapor pressure. Silver halide seals are permeable to gases, are not compatible with high temperature excursions, and further require a fluorine constituent in the optical material.

Finally, mechanical joints may be made to optical elements using wire or foil gaskets. Seals are created by causing the gasket material to flow, thereby filling imperfections and gaps between the metal and the optical substrate. The metal must be deformed beyond its elastic limit to flow into the imperfections; therefore, this method requires either extremely low elastic strength metals, such as indium or lead, or an optical material strong enough to withstand the large loads necessary to deform the gasket material. Indium and lead melt at low temperature. Silver, copper, aluminum and gold all have tensile strengths which vary generally from 10,000 psi to greater that 60,000 psi. Because sapphire and quartz may be joined to metal by brazing, no increase in the number or type of optical materials is gained by this method.

Joints employing foil or wire seals generally have relatively stiff and massive metal members intentionally selected for rigidity to produce a deformation in the gasket material when the sealing load is applied. The alignment between the optical element and sealing surfaces must be extremely flat, and maintained during thermal cycles, to withstand the high sealing load. Typically, the metal component selected has expansion characteristics nearly matching the expansion characteristics of the optical substrate. Misalignment between the rigid metal components and the optical element may cause a gap to develop, or the optical element may break because of concentrated stress at "point-stresses". These hermetically sealed optical assemblies intrinsically have high stress thereby producing unwanted strain in the optical material. Frequently, such strain is catastrophic, resulting in fracture of all but the strongest, useful optical materials. Even without fracture, the strain may be sufficient to produce optical distortions.

A heretofore unmet need exists for optical assemblies enabling low-strain ultra-high vacuum seals to be formed at room temperature to optical elements such as windows, lenses, prisms and the like. Particularly needed are optical assemblies using fragile materials, requiring low distortion, employing special coatings incompatible with thermal cycling, and utilizing materials having chemistries incompatible with metallization or glass-to-metal fusion techniques.

SUMMARY OF THE INVENTION WITH OBJECTS

A general object of the invention is to provide an ultrahigh vacuum optical mounting assembly that overcomes the limitations and drawbacks of the prior art.

Another general object of the invention is to provide an ultra-high vacuum optical mounting assembly which is principally mechanical thereby not requiring specific chemistries to create a seal.

Still another general objection of the invention is to provide an ultra-high vacuum optical mounting assembly capable of sealing to a wide variety of ceramic, glass, crystal and mineral optical elements.

One more general object of the invention is to provide an ultra-high vacuum optical mounting assembly employing exclusively low-vapor pressure materials.

A specific object of the invention is to provide an ultra-high vacuum optical mounting assembly which may be fabricated at room temperature.

Another specific object of the invention is to provide an ultra-high vacuum optical mounting assembly which is capable of thermal cycling.

Still another specific object of the invention is to provide an ultra-high vacuum optical mounting assembly which results in low sealing stresses thereby producing low strain optical assemblies particularly suitable for sealing fragile optical materials.

One more specific object of the invention is to provide an ultra-high vacuum optical mounting assembly which employs at least one flexible element to accommodate misalignment of the optical element as well as to provide spring-like energy to maintain low seal stresses during thermal cycling.

Yet another specific object of the invention is to provide an ultra-high vacuum optical mounting assembly having both a flexible lid and a rigid base each defining components of an hermetic joint in which at least one of the sealing surfaces is machined at an engineered angle thereby creating a raised "knife-edge" contact surface.

Yet one more specific object of the invention is to provide an ultra-high vacuum optical mounting assembly wherein the space between the knife edges of the lid and base is engineered to result in a squeeze on the interposed optical element.

An additional specific object of the invention is to provide an ultra-high vacuum optical mounting assembly wherein an application of moderate force to the outer periphery of the flange of the lid causes the flange to bend at the periphery and the lid to spring away from the base portion thereby gradually and evenly applying a small load to seal the window.

One additional specific object of the invention is to provide an optical mounting assembly having metallic seals interposed between the knife-edges and the optical element, and wherein the gradually applied sealing forces cause the deformation of the metallic seals thereby creating near perfect hermetic joints.

Yet an additional specific object of the invention is to provide an ultra-high vacuum optical mounting assembly having electrodeposited metallic layers on the knife-edges, and wherein the gradually applied sealing forces cause the deformation of the metallic coating thereby creating near perfect hermetic joints.

Yet one additional specific object of the invention is to provide an optical mounting assembly wherein, when compressive forces are applied, the flange of the lid acts as a flat spring by compressing and bending at the periphery, the central area of the lid springs outwardly, and no gap remains between the opposed lid and base at the periphery.

Another additional specific object of the present invention is to provide an optical mounting assembly for sealing a flat, curved, or angled element, such as glass windows, lenses, prisms, mirrors and other non-transmissive optics.

One more additional specific object of the present invention is to provide an optical mounting assembly for sealing an optical element wherein the compressive forces applied to the element may be controlled by varying the gap between the mating lid and base while simultaneously varying the gap between the knife edges, by varying the gap between the flanged portion of the lid and the face of the base, and by varying the thickness of the flanged portion of the lid.

Yet one more additional specific object of the present invention is to provide an optical mounting assembly wherein the spring mechanism is a flexible member integral with the knife edges.

A further additional specific object of the present invention is to provide an optical mounting assembly wherein a sealed cavity is formed between the seals made to the optical device and a hermetic seal created by welding the opposed lid and base following application of compressive sealing forces.

An hermetically sealed optical mounting assembly particularly suitable for sealing a fragile optical material such as window, lens, prism or the like, is fabricated from high-tensile-strength, weldable metals or alloys and includes at least one flexible element and one rigid element. Lid and base portions comprise a mating pair of sealing elements, which when brought together by an applied force at the perimeter of the lid, enclose the interposed optical element thereby forming 0an hermetic joint. The sealing surfaces of the metallic components are machined to provide a narrow line of contact between the metallic elements and the optical element. The three elements (lid-optical element-base) are co-jointly sealed by deformation of interposed thin foil gaskets, or electrodeposited layers of metal on the knife edges. When deformed, the metal coatings or gaskets produce substantially perfect seals. A gap between the sealing surfaces of the lidbase pair is engineered to be smaller than the thickness of the interposed optical element which is "pinched" or "squeezed" by the lid-base pair. The amount of squeeze on the optical element may be controlled independently from the amount of flex imported to the spring-like portion of the lid.

The lid portion, preferably the "flexible element", defines a body having an aperture therethrough for mounting the optical element and an annular bendable flange. A circumferential band is defined in the wall surrounding the aperture to create a window sealing surface defining at least one small angle thereby creating the "knife-edge" for grasping the optical device.

The base portion defines a mating, generally rigid annular flange, a mating aperture for mounting the window or port, and a mating sealing surface defining at least one small angle and forming a base "knife edge" for grasping the optical device.

The narrow, thin metallic gaskets having an outer diameter slightly greater than the diameter of the optical device are placed over the periphery of the top and the bottom surfaces of the optical device thereby interposing the gasket between the knife edges and the optical device. Alternatively, the electrodeposited layer of metal may be used to coat the knife edges of the lid and base.

When assembled, and prior to the application of compressive forces to form an ultra-high vacuum seal, the intentionally engineered "ear" gap exists between the opposed flanges of the lid and base portions, and the knife edges rest lightly against the metallic gaskets covering the periphery of the optical element. The second, optional gap provided between the opposed lid and base portions nearest the optical element controls pivot of the lid towards the sides of the optical element during application of compressive forces. Additionally, a third gap is typically provided between the sides of the optical element and the lid and base to further control the amount of lateral pressure applied to the optical element.

To create an ultra-high vacuum seal, a modest clamping pressure is applied to the outer periphery of the opposed flanges to force the periphery of the lid flange to bend towards the base flange. The ear gap is eliminated at the outer periphery of the flanges, and the bending of the flanges creates a lid spring mechanism causing the central portion of the lid inward from the bent periphery to spring outwardly away from the mating base portion. The spring action of the lid as the flange of the lid is compressed and bent causes the compressive load forces to be gradually applied to the optical element as the load is transferred from the periphery towards the outwardly bending central portion of the lid, to the knife edges, and then gradually and evenly to press against the metallic seals causing deformation thereof and a resulting seal.

Following application of the compressive forces, the compressed contiguous peripheral areas of the flanges of the bent lid and the base are welded to form a hermetic joint around the entire periphery of the optical mounting assembly. The assembly is preferably then attached to a weld adapter, which is welded to the base, and placed within the aperture of a vacuum flange which is in turn welded to the weld adapter.

All metallic parts of the optical mounting assembly are highly polished and the optical elements are finished and substantially optically flat.

In another aspect of the present invention, the flange of the lid is thicker and not bendable, and the lid knife edge is integral with at least one angled spring member which acts as a spring mechanism and bends upon the application of compressive sealing forces to the flanges. In this aspect, the base preferably also defines an angled spring member integral 0with the base knife edge which also functions as a spring mechanism that bends upon application of sealing forces.

In yet another aspect of the present invention, a vacuum guard may be inserted through an aperture in the base to connect with the sealed cavity formed between the ultra high vacuum seal around the optical element and the hermetic seal around the flange.

In all aspects of the invention, it is preferable to use a minimal amount of compressive force to seal the fragile optical elements. To accommodate optical elements of variable fragility, the thickness of the lid flange, the "ear", may be varied to control the amount of spring, the second gap may be eliminated to further control rotation of the lid and base toward the sides of the optical element, and the gap between the sides of the optical element and the assembly may be varied.

These and other objects, features, aspects and advantages of the present invention will be more fully apparent to those skilled in the art upon consideration of the following detailed description of the preferred embodiments, presented in conjunction with the accompanying drawings.

DESCRIPTION OF PREFERRED EMBODIMENTS

Figure 1:
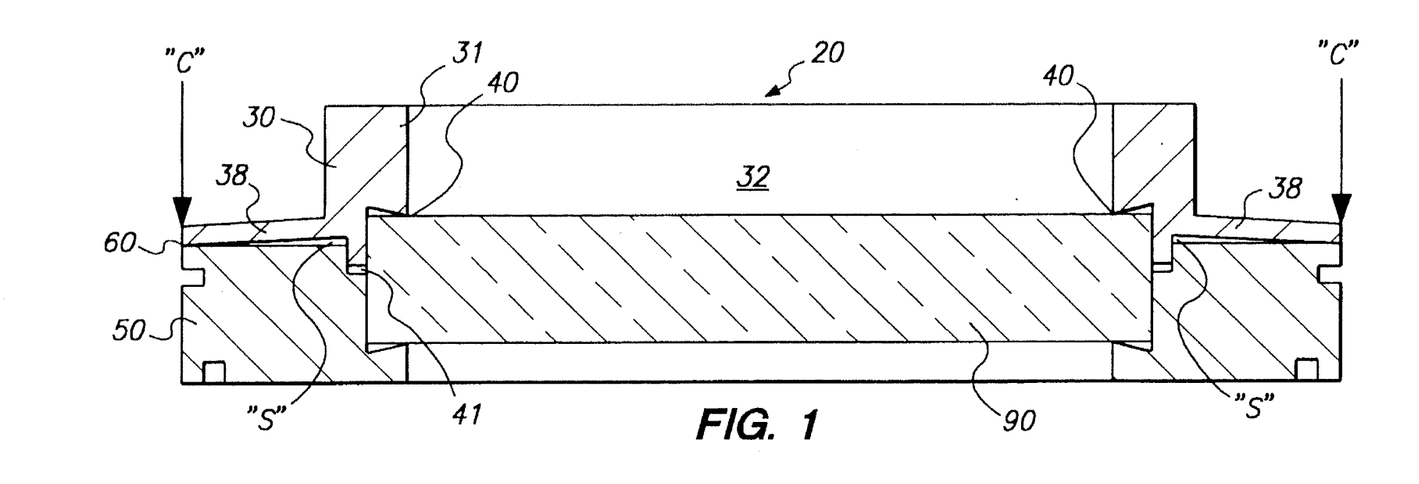
FIG. 1 is a side sectional view of an assembled hermetically sealed optical mounting assembly embodying the principles of the present invention and showing the spring action when force is applied to the periphery of the flange of the lid to form an ultra high vacuum seal around an optical element.
Figure 2:
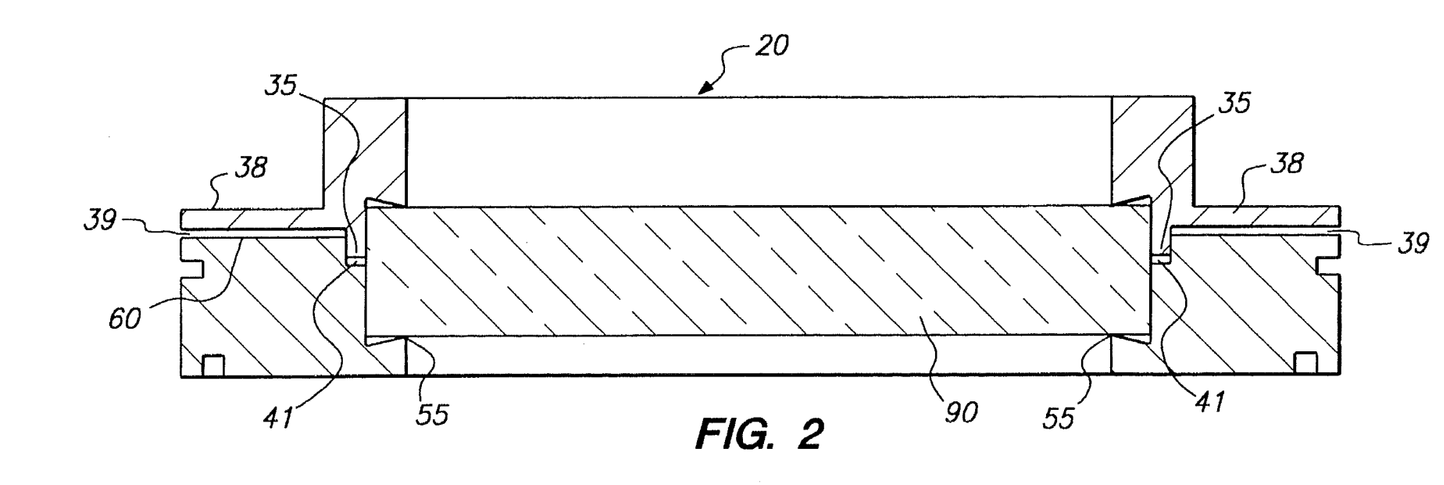
FIG. 2 is a side sectional view of the assembly of FIG. 1 shown prior to application of compressive sealing force and demonstrating the engineered ear gap between the flange of the lid and the flange of the base and the engineered gap between the lid and the base adjacent to the optical element.
Figure 3:
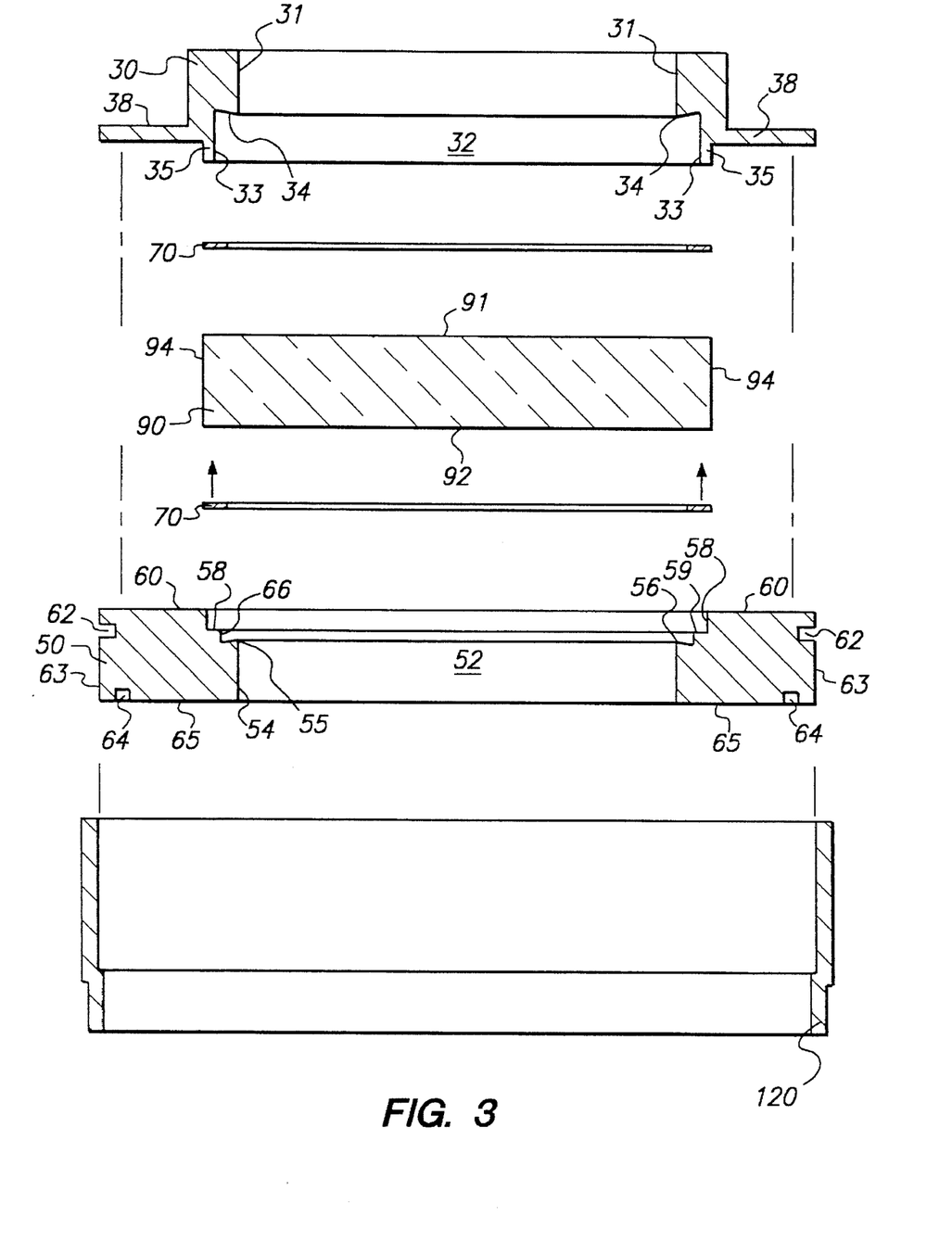
FIG. 3 is an exploded view of the optical mounting assembly and optical element of FIGS. 1 and 2 and including a weld adapter device.

Referring to FIGS. 1, 2 and 3, an hermetically sealed optical mounting assembly embodying the principles of the present invention for sealing a fragile optical device is depicted generally at 20. The optical device is an optical window presented as an example only, and it will be recognized by those skilled in the art that the optical mounting assembly may be used to seal other objects, including, but not limited to, lenses, prisms, and the like. The optical mounting assembly 20 includes a lid 30, a base 50, and two annular seals or gaskets 70 for sealing the window 90. Alternatively, the annular gaskets 70 may be omitted and the knife edges may be coated with a metallic element.

The generally cylindrical lid 30 is preferably constructed from a high yield strength metallic alloy or material, for example 304 stainless steel. The cylindrical lid body 30 defines an upper interior side wall 31 surrounding a circular aperture 32, a narrow circumferential sealing surface wall 34 formed at a generally right angle bend in the side wall 31 and defining a small angle, a lower window facing wall 33 extending at generally right angles to the sealing surface wall 34, and a thin, bendable peripheral flange 38.

Figure 7:
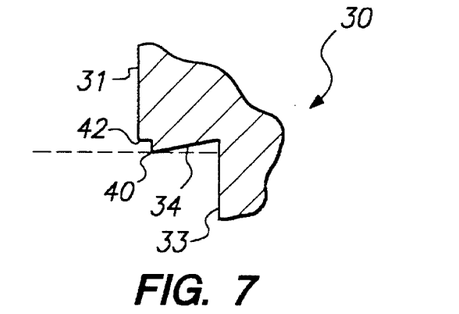
FIG. 7 is an enlarged view of the window mounting portion of the lid showing the knife edge formed by the intersection of the side wall of the lid and a 7° angled wall extending therefrom, and further showing an undercut step.

As best seen in FIG. 7, the small angle of the sealing surface wall 34, preferably 7 degrees, creates a raised annular protrusion contact area, the "knife edge" shaped for example, as a pointed edge 40 having a generally conical section. The angle of the sealing surface wall 34 may vary from 3° to 15°, and a 7° angle is preferred. Additionally, an undercut recess 42 extends between the lower edge of the wall 31 and the knife edge 40. The undercut recess 42 is designed to allow space for any excess material of the gaskets 70 to prevent the material of the gaskets 70 from being extruded onto the viewing surface area of the window 90.

Figure 5A:
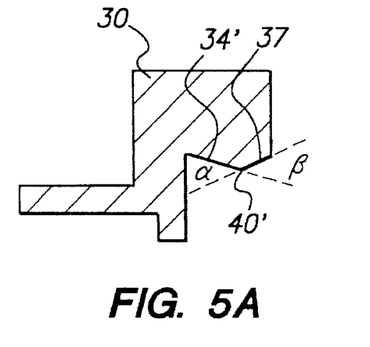
FIGS. 5A and 5B are enlarged views of alternative aspects of the knife edges, which are defined as any raised contact area, such as a knife edge formed at the intersection of a straight wall and an angled wall, a pointed edge formed at the intersection of two angled walls, or a rounded protrusion.
Figure 5B:
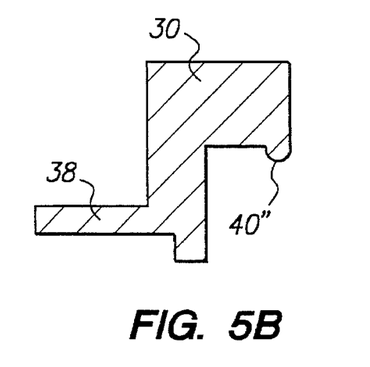

FIGS. 5A and 5B show alternative configurations for the "knife edge" 40, which is defined as any raised contact area. In FIG. 5A, a knife edge 40' is formed at the intersection of two tapered sealing surfaces 34', 37. The two sealing surfaces 34' and 37 may define different angles generally from 3° to 15°, α and β respectively, with the β angle preferably larger than the α angle. In FIG. 5B, a knife edge 40" defines a rounded protrusion. It will be recognized by those skilled in the art that the knife edge may also be a circular bump.

Figure 4:
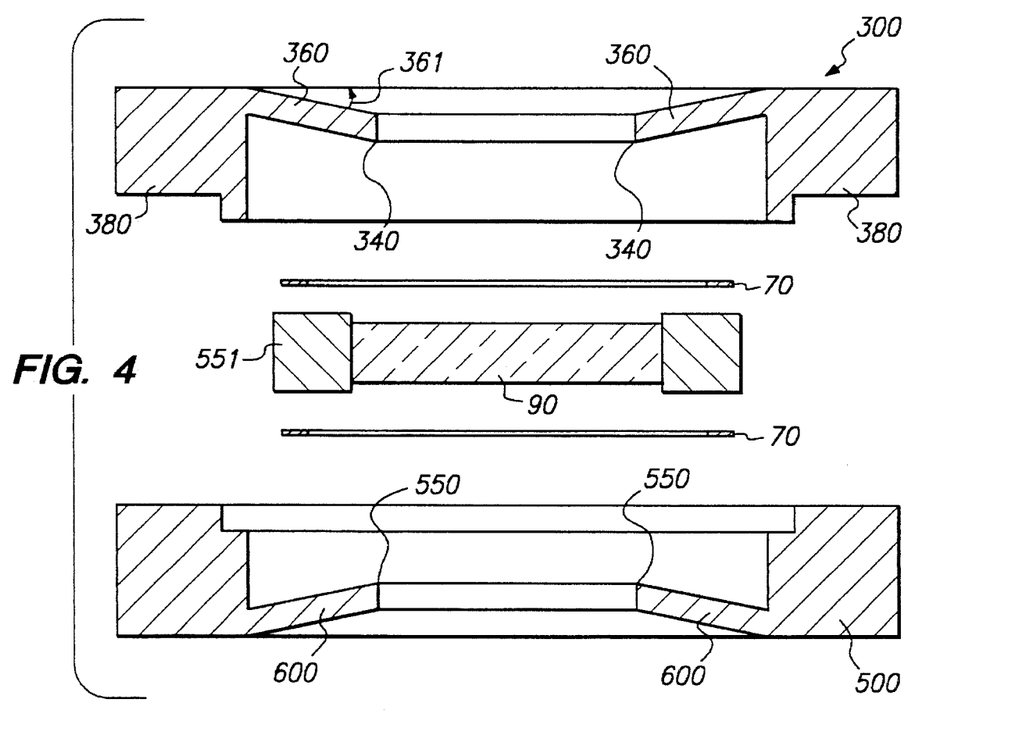
FIG. 4 is a side sectional view of another aspect of the present invention showing the spring portion of the lid integral with the knife edges of the lid and the base and further showing a window centering ring.

Referring now to FIG. 4, another aspect of the lid is shown generally at 300. In this aspect, the flange 380 is thicker and substantially rigid, and a conical spring member 360 acts as a spring. The spring member 360 is integral with the knife edge 340. The angle 361 of the spring member 360 may be varied from approximately 7° to 20°. FIG. 4 additionally shows a centering ring 551 that may be used to support and position the window 90. The FIG. 4 embodiment also provides a spring mechanism in the base to be described later.

In each of the aspects shown in FIGS. 1, 4, 5A, 5B, the lids 30, 300 generally define an annular body portion that is relatively massive and rigid to limit rotation and flex at the sealing surfaces 34, 34' by preventing transfer of any torsion and rotational forces from the flange 38, 380 or spring member 360 during application of compressive load forces. Additionally, the bendable flange (ear) 38 of the preferred embodiment may be varied in thickness to control the amount of spring provided by the lid. It will be recognized by those skilled in the art that the thickness is a function of the diameter of the lid 30, and that thinner flanges are preferred for sealing more fragile optical elements while thicker flanges may be used for less fragile elements. Depending upon the element to be sealed, the flange generally varies in thickness from approximately 15 to 45 thousandths of an inch.

Referring now to FIGS. 1,2 and 3, the generally cylindrical base portion 50 is also fabricated from a high yield strength metallic alloy or material, for example 304 stainless steel, and defines the essentially mating sealing architecture as the sealing architecture of the lid 30. The base defines an interior side wall 54 surrounding a circular aperture 52, a narrow circumferential sealing surface wall 56 formed at a generally right angle bend in the side wall 54 and defining a small angle, a step 58, and a step 59 including side wall 66. The sealing surface wall 56 defines an angle substantially the same as the angle defined in the sealing surface wall 34 of the lid, preferably 7°, and variable between 3° and 15°.

The raised, annular contact area 55 is also a pointed knife edge as in 40, and may also be formed at the intersection of two angled surfaces, or in the shape of a rounded protrusion as shown in FIGS. 5A and 5B for the lid 30. Preferably, the base 50 includes an undercut the same as that shown in FIG. 7, and additionally step 58 is provided between the top surface 60 and the sealing surface 56.

Figure 6:
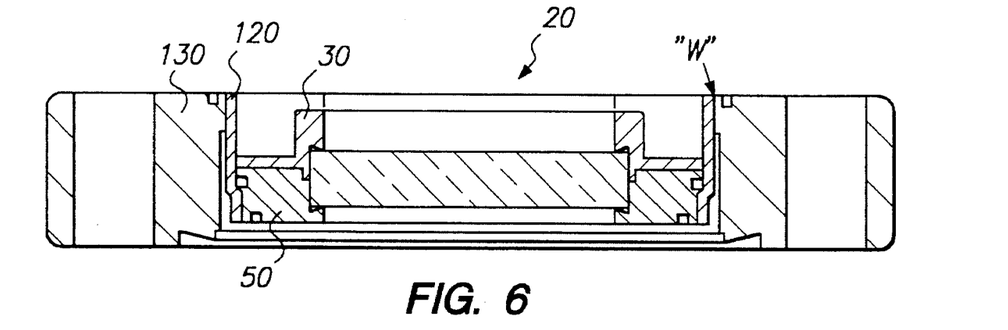
FIG. 6 is a side sectional view of the assembly of FIG. 5 including the weld adapter device, and mounted within a vacuum flange.

The top surface of the base 50 forms a mating flange surface 60, and the thickness of the body of the base 50 is sufficient to substantially prevent bending of the base 50. The generally massive, rigid configuration of the base 50, generally of greater mass than the lid 30, enables the optical mounting assembly 20 to be joined to another member, for instance by welding, without the transmission of weld stresses to the seal around the window 90. Handling recesses 62 and 64 are provided are provided for this purpose, respectively, in the circular exterior side wall 63 and the bottom wall 65. As shown in FIG. 6, the optical mounting assembly 20 is attached to an annular weld adapter device 120 which is, in turn mounted within a vacuum flange 130 and welded together at "W".

Referring now to FIG. 4, another aspect of the base is shown generally at 500, and defines a conical spring member 600 to act as a second spring member in conjunction with the spring member 360 of the lid 300. The spring member 600 is also integral with the knife edge 550.

As described above in connection with the lid 30, the relatively massive, rigid base limits rotation and flex at the sealing surfaces 55, 550 by preventing transfer of any torsion and rotational forces created by the application of compressive load forces.

Figure 9:
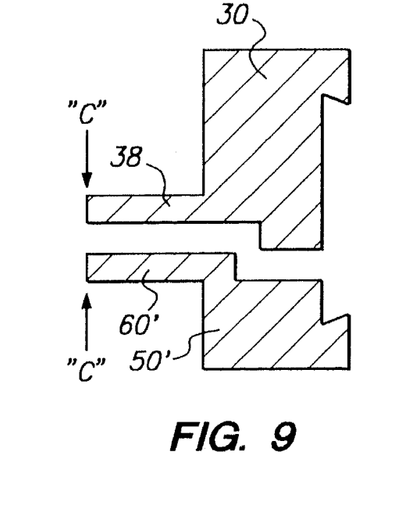
FIG. 9 is a partial side sectional view of another aspect of the optical mounting assembly showing flexible lid and base flanges.

Referring now to FIG. 9, another aspect of the base is shown at 50' and defining a mating, narrow flange 60' as opposed to the rigid flange surface 60 in FIG. 1. The narrow flange 60' also serves as a flat spring so that both flanges 38 and 50' act as spring members and bend toward each other upon the application of compressive forces at the directional arrows. The FIG. 9 configuration is particularly suitable for sealing highly fragile windows or optical devices.

All of the protruding surfaces of the lid 30 and the base 50 are highly polished and finished, and the object to be sealed, for instance an optical window, is substantially optically flat to within two waves at 630 nanometers with, typically, an 80-50 scratch-dig optical finish.

As best shown in FIG. 3, seals or gaskets 70 are placed between the knife edges 34 and 55 and the window 90. Conventional aluminum-foil rings having a diameter slightly larger than the diameter of the window 90 are pressed onto the upper and lower surfaces 91, 92 of the window 90 and extend slightly beyond the circular side wall 94. The aluminum-foil gaskets 70 are preferably approximately 0.0005 to 0.002 inches thick and 1/16th of an inch in width. Aluminum-foil gaskets are preferred, but any soft, malleable metal, such as copper, gold, or silver may be used for the gaskets 70. Alternatively, the gaskets 70 may be omitted when the knife edges of the lid and base are plated with gold, copper, silver or aluminum, preferably to a depth of 50–100 millionths of an inch.

When assembled as shown in FIG. 2 prior to the application of compressive forces to create a sealing load, an engineered ear gap 39 exists between the opposed faces of flange 38 and flange 60. The ear gap 39 is designed to provide residual spring stress and may be varied from approximately 0.005 to 0.030 inches in order to control, in conjunction with the width of the flange 38, the amount of spring and the residual spring load.

Figure 12:
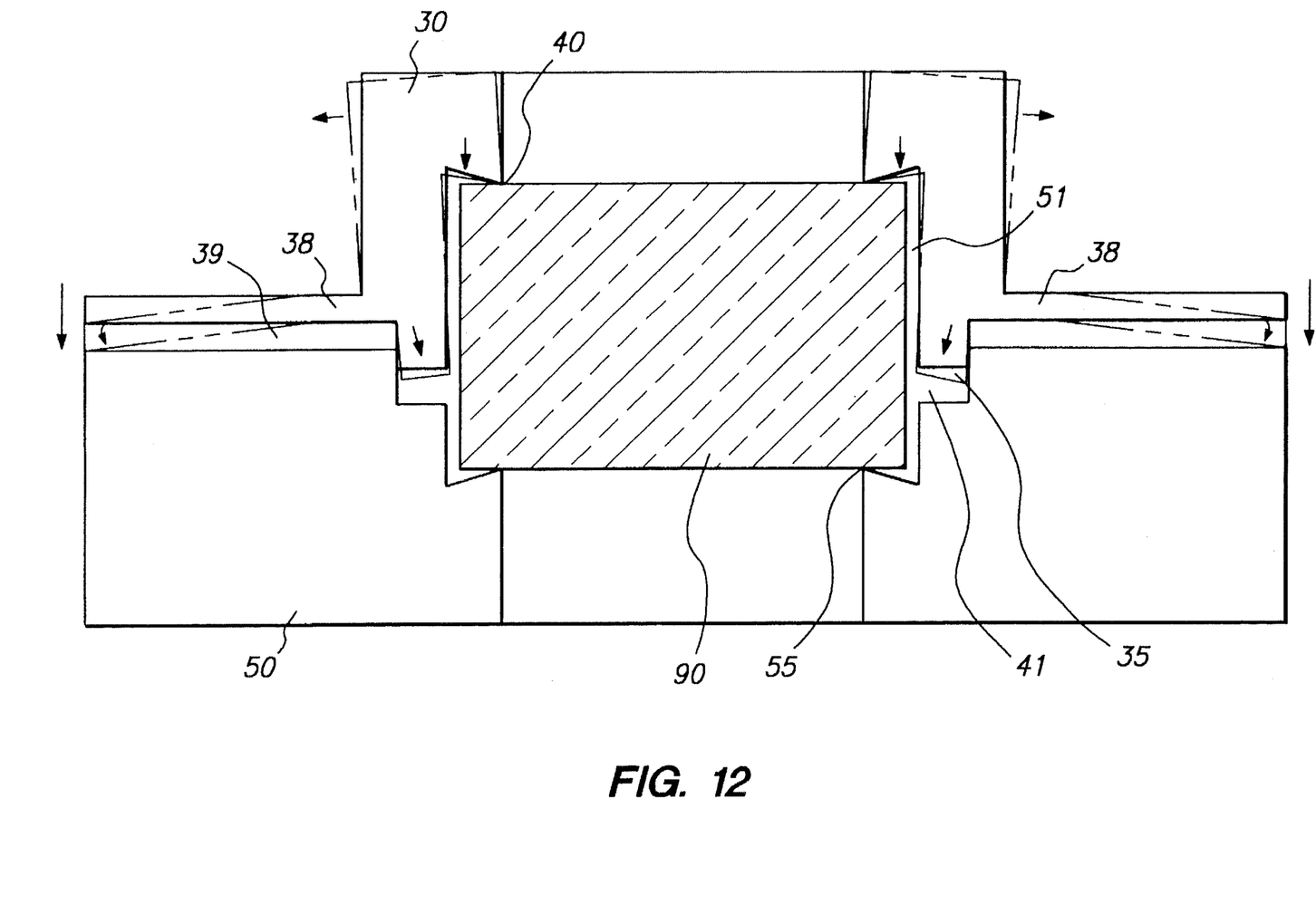
FIG. 12 is a side sectional view of an optical assembly showing the pre-compression positions of the lid and flange, and further showing, with directional arrows and dashed lines, the position of the flanges, the body of the lid, the knife edges, and the lid-base gap nearest the optical element following the application of compression sealing forces.

Additionally, a gap 41 may be provided between facing surfaces of a lid step 35 and a base step 59 which further serve as centering structures for the assembly 20. The width of the gap 41 may be different than the width of the gap 39 and is engineered to be smaller than the thickness of the object to be mounted by at least from 0.005 to 0.030 inches. Provision of the gap 41 controls the degree to which each pair of the knife edges 40 and 55 are permitted to move toward each other thereby controlling the net pressure applied to the window 90. As best shown in FIG. 12 by the directional arrows and dashed lines, upon the application of the compressive sealing forces to the outer periphery of the flange 38, the body of the lid 30 springs outwardly and transfers the sealing force to the knife edges 40, 55. The knife edge 40 moves downwardly towards the knife edge 55 and rotates slightly to the position shown in dotted lines. In turn, step 35 moves slightly downwardly closer to base step 59 thereby typically lessening or eliminating gap 41. When step 35 comes into contact with step 59, rotation inward of step 39 is substantially prevented thereby controlling the amount of lateral pressure applied to the window 90. If the gap 41 is substantially eliminated prior to application of compressive sealing forces, lateral squeeze on the window is substantially prevented. For example, when the window 90 is 0.200 inches thick, the gap 39 is 0.020 inches, and the space between the knife edges 40,55 after sealing is controlled to 0.1995, the gap 41 is typically reduced to zero and the net pressure applied to the window upon the application of compressive forces to force the outer edges of the flanges together is 0.0005.

Additionally, when assembled, a small gap 51 (best shown in FIGS. 10 and 12) preferably exists between the side wall 94 of the window 90 and the window mounting walls 30 and 58 thereby, in conjunction with the rigidity of the bodies of the lid and base and the provision of the gaps 39 and 41, further prevents rotational forces at walls 33 and 66 from being transferred to the window 90.

Figure 10:
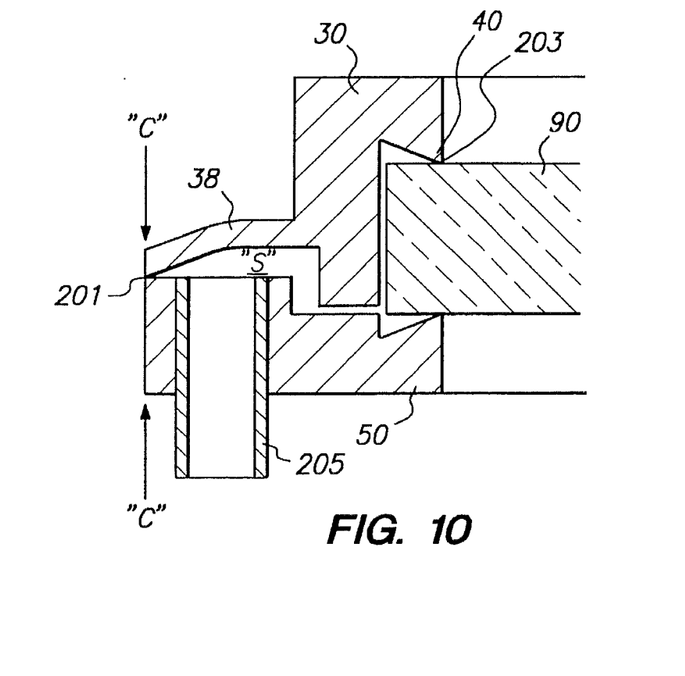
FIG. 10 is a partial side sectional view of a optical mounting assembly having a vacuum guard into the sealed cavity formed between the ultra high vacuum window seal and the hermetic flange seal.

Referring now to FIG. 1 and FIG. 10, the assembled optical mounting assembly and window is shown following the application of compressive sealing forces to the flange 38 at the periphery shown at arrows "C". Generally, a load of approximately 200 to 2000 pounds is applied to seal the optical devices generally used. The outer periphery of the flange 38 is bent towards the substantially non-deformable flange surface 60 until the two flange surfaces meet. The remaining portion of the lid 30 springs outwardly away from the base 50 thereby enabling the compressive sealing forces to gradually, and substantially linearly, be transferred from the outer periphery of the flange 38 through the remainder of the lid 30, to the knife edges which rotate slightly and apply the sealing force to the window 50. The energy of the spring forces stored in the lid 30 provides constant tension at the knife edge 40 to form an ultra high vacuum seal.

The outer, opposed flange faces are welded together following application of the compressive sealing forces thereby creating a hermetic joint around the entire circumference of the optical mounting assembly. As best seen in FIGS. 1 and 10, a sealed chamber space "S" is created between the two seals between the ambient side and the ultra high vacuum side, namely the hermetic seal 201 at the flanges and the ultra high vacuum seal 203 created by the interface between the knife edge and the window. In FIG. 10, a vacuum guard inlet 205 is shown interfacing with the chamber space "S" to provide an inlet into the space "S" for supplemental vacuum pumping if needed or desired. A channel (not shown) may be formed through step 39 so that secondary vacuum pumping will not be affected by variations in, or elimination of, gap 41 upon the application of compressive sealing forces.

Figure 11:
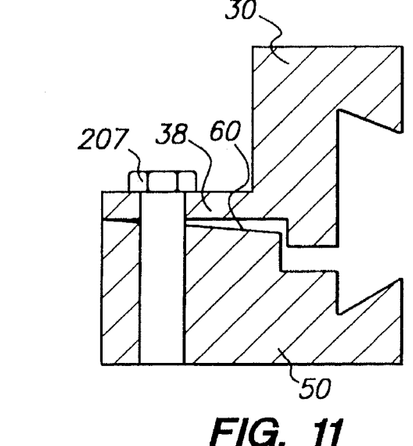
FIG. 11 is a partial side sectional view of an optical mounting assembly having the lid and base flanges clamped by bolts instead of secured by welding.

Referring now to FIG. 11, the welded hermetic seal may be omitted, and the two flanges 38,60 may be held together with clamps or bolts 207 thereby providing only the ultra high vacuum seal at the window.

Figure 8A:
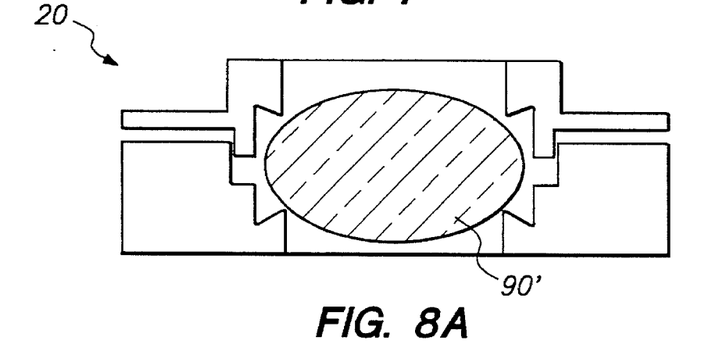
FIGS. 8A and 8B show optical mounting assemblies for sealing angled and curved objects such as lenses and prisms or wedges.
Figure 8B:
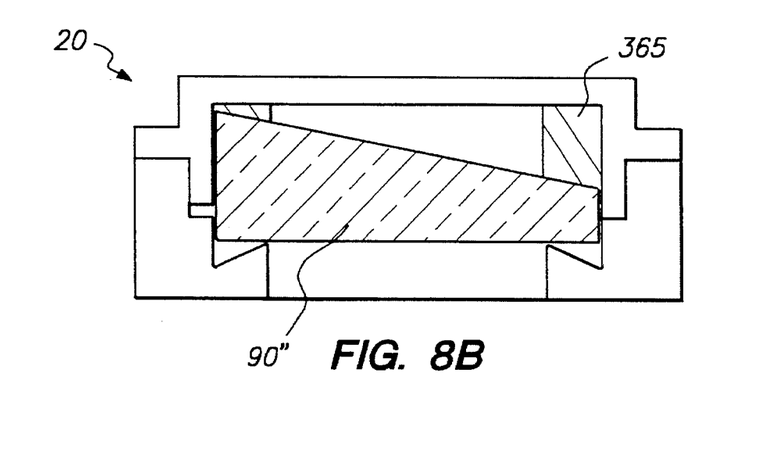

Referring now to FIGS. 8A and 8B, the optical mounting assembly 20 of the present invention may also be used to seal a lens 90' (FIG. 8A) or a wedge shaped window or prism 90" (FIG. 8B). One or more spacers 365 are added to compensate for differences in the width of the object to be sealed.

Although preferred embodiments of the present invention has been disclosed, it is contemplated that various modifications of the invention will become apparent to those skilled in the art after having read the foregoing description. Accordingly it is intended that the description be interpreted to cover all alterations and modifications which fall within the true spirit and scope of the invention.

What is claimed is:

1. An ultra high vacuum mounting assembly comprising:

a lid member defining a circumferential wall surrounding a first aperture extending through the lid member, the lid member defining a flexible member extending therefrom, a sealing surface, and a first knife edge extending into the aperture; and a base member having a circumferential wall surrounding a second aperture aligned with the aperture of the lid member and extending through the base member; the base member defining a sealing surface extending outwardly around the circumferential wall of the base member and a second knife edge into the second aperture, wherein application of a sealing force to at least the lid member causes a spring action in at least the spring member and concentration of the sealing force at the first and second knife edges.

2. The ultra high vacuum mounting assembly of claim 1 further comprising gasket means at the first and second knife edges.

3. The ultra high vacuum mounting assembly of claim 2 wherein the sealing surface of the base member is integral with a flexible flange of the base member, application of the sealing force causing deflection of at least the flange of the base member.

4. The ultra high vacuum mounting assembly of claim 2 wherein the gasket means is a first and a second metallic gasket positioned, respectively, between the first and second knife edges.

5. The ultra high vacuum optical mounting assembly of claim 2 wherein the gasket means is a metallic Coating on the knife edges of the lid and base members.

6. The ultra high vacuum optical mounting assembly of claim 2 further comprising means for controlling the spring action.

7. The ultra high vacuum mounting assembly of claim 7 wherein the sealing surface of the lid member is integral with the flexible member which is a flange and wherein the means for controlling the spring action is at least an engineered gap between the flange and the sealing surface of the base member prior to application of the sealing force.

8. The ultra high vacuum mounting assembly of claim 2 further comprising means for controlling a distance between the first and second knife edges upon the application of the sealing force.

9. The ultra high vacuum mounting assembly of claim 8 wherein the means for controlling the distance between the first and second knife edges is at least a gap between the lid member and the base member adjacent to the first and second apertures prior to application of the sealing force.

10. The ultra high vacuum mounting assembly of claim 2 wherein the knife edges are adapted for securing an insert therebetween upon application of the sealing force, and further comprising means for fastening the sealing surface of the lid member to the sealing surface of the base member, fastening of the sealing surfaces and securing the insert between the knife edges creating a sealed chamber extending, from the knife edges to an area of fastening of the sealing surfaces.

11. The ultra high vacuum mounting assembly of claim 10 further comprising a vacuum pump channel extending through the base member to communicate with the sealed chamber.

12. The mounting assembly of claim 1 adapted to mount an insert between the first and second knife edges so that a gap exists between the insert and the circumferential walls of the lid and base members.

13. An ultra high vacuum mounting assembly comprising:

a lid member defining a body having a first sealing surface, an interior first aperture, and a first deflectable spring member extending at a selectable angle into the aperture and defining an integral first knife edge; and a base member defining a body having an opposed second sealing surface, an interior second aperture, and a second deflectable spring member facing the deflectable spring member of the lid and defining an integral second knife edge, wherein application of a sealing force to at least the body of the lid member causes deflection of the first and second spring members and concentration of the sealing force at the first and second knife edges.

14. The ultra high vacuum mounting assembly of claim 13 further comprising gasket means at the first and second knife edges.

15. The ultra high vacuum mounting assembly of claim 14 further comprising means for controlling the deflection.

16. The ultra high vacuum mounting assembly of claim 14 further comprising means for controlling a distance between the first and second knife edges upon the application of the sealing force.

17. An ultra high vacuum mounting assembly comprising:

a lid member defining a body having a first sealing surface, an interior first aperture, a flexible spring member, and a knife edge extending into the aperture; and A base member defining a body having an opposed second sealing surface and an interior opposed second aperture, wherein application of a sealing force to at least the lid member causes deflection of the spring member and concentration of the sealing force at the knife edge.

18. The mounting assembly of claim 17 further comprising gasket means at the knife edge for sealing the knife edge when adapted to seal an insert within the aperture.

19. The mounting assembly of claim 17 further comprising means for controlling deflection of the spring member.

* * * * *